United States Patent
Allen et al.

(10) Patent No.: US 7,259,971 B1
(45) Date of Patent: Aug. 21, 2007

(54) ENCAPSULATED ELECTRONIC POWER CONVERTER WITH EMBEDDED AC COMPONENTS

(75) Inventors: Michael W. Allen, Shortsville, NY (US); Robert J. Kolbet, Macedon, NY (US)

(73) Assignee: Z-Axis, Inc., Phelps, NY (US)

( * ) Notice: Subject to any disclaimer, the term of this patent is extended or adjusted under 35 U.S.C. 154(b) by 274 days.

(21) Appl. No.: 10/717,887

(22) Filed: Nov. 20, 2003

Related U.S. Application Data (60) Provisional application No. 60/492,439, filed on Aug. 4, 2003.

(51) Int. Cl.
*H05K 9/00* (2006.01)

(52) U.S. Cl. ............ 361/816; 361/789; 439/607; 439/939

(58) Field of Classification Search ............ 363/21.12, 363/95, 97, 41, 74, 20, 131, 89, 57, 53, 45, 363/49, 21.13, 147; 439/502, 501; 361/799, 361/704, 708–715; 174/16.3, 52.4
See application file for complete search history.

(56) References Cited

U.S. PATENT DOCUMENTS

| | | | |
|---|---|---|---|
| 4,622,627 A * | 11/1986 | Rodriguez et al. ............ 363/37 |
| 4,631,470 A | 12/1986 | Bingley | |
| 4,825,350 A | 4/1989 | Brackman, Jr. | |
| 4,906,208 A * | 3/1990 | Nakamura et al. .......... 439/607 |
| 5,122,724 A | 6/1992 | Criss | |
| 5,395,264 A * | 3/1995 | Keith ......... 439/502 |
| 5,420,780 A | 5/1995 | Bernstein et al. | |
| 5,499,184 A * | 3/1996 | Squibb ......... 363/100 |
| 5,615,097 A * | 3/1997 | Cross ......... 363/84 |
| 5,636,109 A | 6/1997 | Carroll | |
| 5,640,312 A | 6/1997 | Carroll | |
| 5,926,373 A | 7/1999 | Stevens | |
| 6,005,773 A | 12/1999 | Rozman et al. | |
| 6,211,457 B1 * | 4/2001 | Cama et al. ......... 174/380 |
| 6,222,749 B1 | 4/2001 | Peron | |
| 6,285,706 B1 * | 9/2001 | Skinker et al. ......... 375/222 |
| 6,317,324 B1 * | 11/2001 | Chen et al. ......... 361/704 |
| 6,349,045 B1 | 2/2002 | Kögel et al. | |
| 6,456,511 B1 * | 9/2002 | Wong ......... 363/21.13 |
| 6,493,245 B1 | 12/2002 | Phadke | |
| 6,669,495 B2 | 12/2003 | Philips et al. | |
| 6,674,271 B2 | 1/2004 | Choo et al. | |
| 6,775,164 B2 * | 8/2004 | Wong et al. ......... 363/147 |

* cited by examiner

*Primary Examiner*—Rajnikant B. Patel
(74) *Attorney, Agent, or Firm*—Duane C. Basch; Basch & Nickerson LLP (57) ABSTRACT

A self-contained and encapsulated AC to Voltage supplying module containing a complete set of AC circuitry components therein and directly connecting the components to the AC voltage source, an inrush protection circuit, a DC-DC converter and power control circuits which enable the encapsulation of AC and DC components within a module being directly mountable and DC electrically connected to a printed circuit board assembly.

20 Claims, 7 Drawing Sheets

ENCAPSULATED ELECTRONIC POWER CONVERTER WITH EMBEDDED AC COMPONENTS

Priority is claimed from the following Provisional Patent Application No. 60/492,439, "ENCAPSULATED ELECTRONIC POWER CONVERTER WITH EMBEDDED AC COMPONENTS," by Allen et al., filed Aug. 4, 2003, which is also hereby incorporated by reference, in its entirety, for its teachings.

This invention relates generally to a power converter, and more particularly to an encapsulated, self-contained converter having alternating current (AC) input circuitry therein and directly connected to an AC line source, said converter being directly mountable and electrically connected to the direct current (DC) circuitry of the associated device and/or printed circuit board.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

Chassis-mounted power supplies are known to include external power connectors and wiring harnesses to connect them to device components and printed circuit boards (PCBs). These chassis-mounted supplies are generally complete supplies, including inrush limiting circuitry, EMI filtering, etc., but have the unfortunate consequence of requiring a cable or wiring interface to the printed circuit board.

Similarly, PCB mountable power converters are used that include standard pins to connect to input power provided on a printed circuit board. These devices require high-voltage traces on the printed circuit board to conduct power from an independent AC connector. These supplies also provide almost no inrush current limiting functionality, and may or may not have sufficient EMI filtering. As is well understood, the EMI characteristics of the device in which the power supply is used may be negatively impacted by the use of AC traces or wiring, and the characteristics of the power supply employed. As a consequence the user must provide an external power connector and make the necessary high-voltage connections on the printed circuit board. Also, the user is typically required to provide some form of inrush current limiting circuitry to protect internal fusing and minimize stresses on the circuitry in such supplies. The additional circuitry and components required to use such supplies may also impact safety agency approval and certification.

As a solution to the inherent problems with existing power supplies, the present invention incorporates improved packaging and design, along with specific circuits that are essential to optimize the benefits of an integrated and encapsulated power converter, whereby all components are contained within a common enclosure. Consequently, it has been determined that once the power supplying components are contained within a common enclosure it is highly desirable to encapsulate the entire power supply to provide environmental protection and immunity to dirt, moisture and vibration. The encapsulant also preferably provides a thermally conductive pathway to dissipate the generated heat of the power switching transistors, rectifier and the transformer. Furthermore encapsulation with a material having a high dielectric constant allows the components to be placed in closer proximity, while maintaining requirements relating to safety and certification.

Therefore, it is apparent that an integrated, encapsulated power converter (EPC) that is mounted on-board, provides a solution to a long standing problem, as mentioned above. In a preferred embodiment, the power converter also has a direct connection to the AC line voltage, thereby eliminating the need for AC wiring within the device. However, in order to take full advantage of this solution, specific circuitry limitations must be addressed. For example, encapsulation limits the ability to replace or reset a fuse or similar safety component within the power module. Accordingly, the circuit design of the present invention is specifically designed to limit excessive current and avoid premature component failure.

It is therefore an object of the invention to provide a highly reliable fully integrated power module that controls the in-rush current and associated voltage stress on the bridge rectifier, line fuses and semiconductor switches.

In accordance with an aspect of the present invention, there is provided an electronic power converter, comprising: an encapsulated portion including at least high-voltage electronic circuitry; and an integrated connector for receiving a detachable line cord having at least two wires therein, wherein said power converter is suitable for mounting on a printed circuit board.

In accordance with another aspect of the present invention, there is provided an electronic encapsulated power converter, comprising: a case; an integrated, multi-pin detachable line cord connector accessible through said case; and threaded mounts extending from said case, wherein the threaded mounts are earth grounded internal to the supply and through a line cord, and allow the converter to be rigidly mounted to a circuit board.

In accordance with yet another aspect of the present invention, there is provided an encapsulated power converter having an inrush current limiting circuit, said inrush current limiting circuit, including: a rectifier with a DC return path; a MOSFET switch connected to the DC return path of the bridge rectifier; a capacitor which is slowly charged via a current limited source; where the charge stored on the capacitor is a source of energy to gate the MOSFET; a voltage level detection circuit to maintain the MOSFET switch in an off state until a line voltage reaches a near zero threshold; a resistive charging path to turn the MOSFET switch to an on state once the line voltage reaches the near zero threshold; and a resistive connection to a housekeeping supply of the power converter which maintains the MOSFET switch in the on state.

In accordance with a further aspect of the present invention, there is provided an electronic device, comprising: at least one circuit board located within the device; a cover enclosing the electronic device; and an electronic power converter including fully encapsulated electronic circuitry; and an integrated connector, accessed through an aperture in said cover, for receiving a detachable line cord having at least two wires therein, wherein said power converted is mounted on said circuit board.

The techniques described above are advantageous because they improve the long term reliability and operational characteristics and simplify the overall design of AC powered electronic equipment. As a result of the invention, it is possible to incorporate integrated power supply componentry into a device without the need to handle AC wiring or switching. Moreover, the life cycle of a discrete, encapsulated power supply with integrated AC components has been improved by adding circuitry to safeguard the high failure power components from excessive electrical stress and at the same time protect the user from exposure to potentially lethal AC line voltage.

BRIEF DESCRIPTION OF THE DRAWINGS

The above and other objects, features and advantages of the present invention will become more clearly understood from the following detailed description taken in conjunction with the accompanying drawings, in which.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements.

Figure 1:
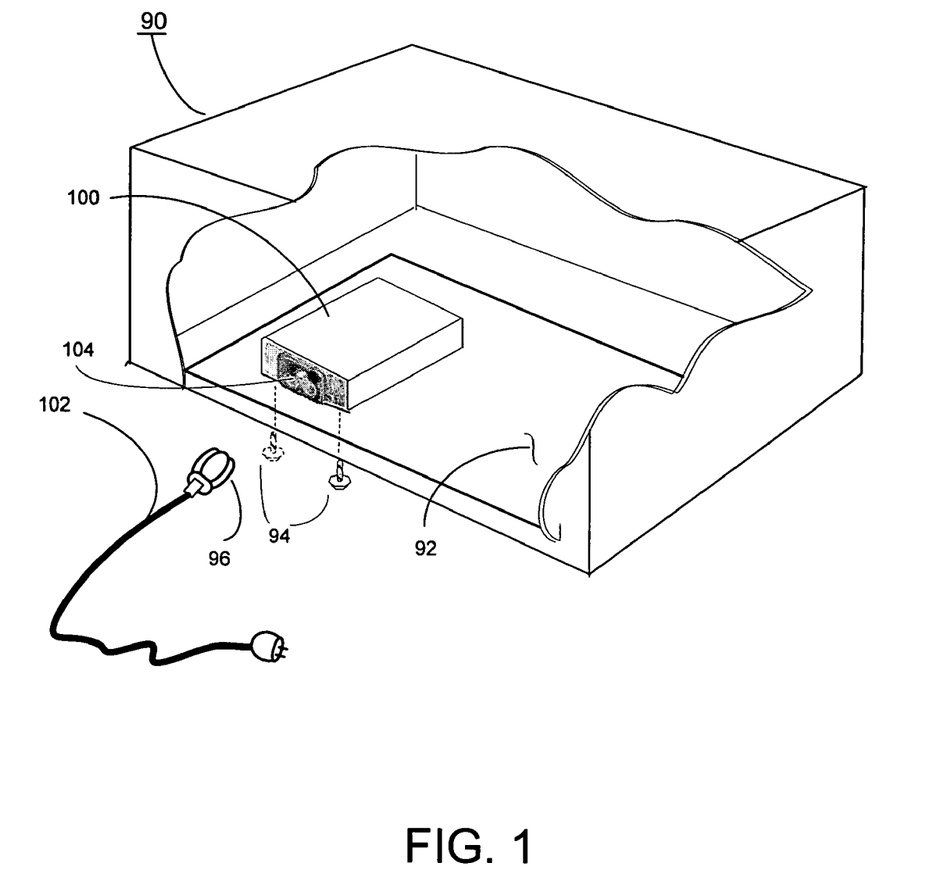
FIG. 1 is an illustrative example of the application of the present invention in an electrical device.
Figure 2A:
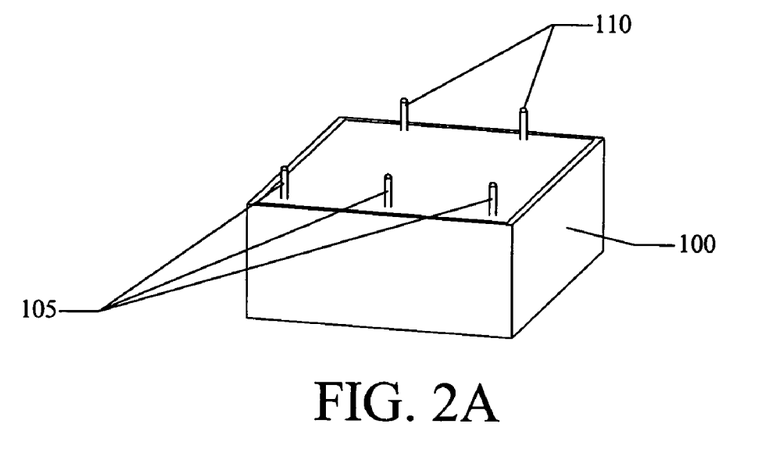
FIGS. 2A-2C are exemplary embodiments for the power converter in accordance with the present invention.
Figure 2B:
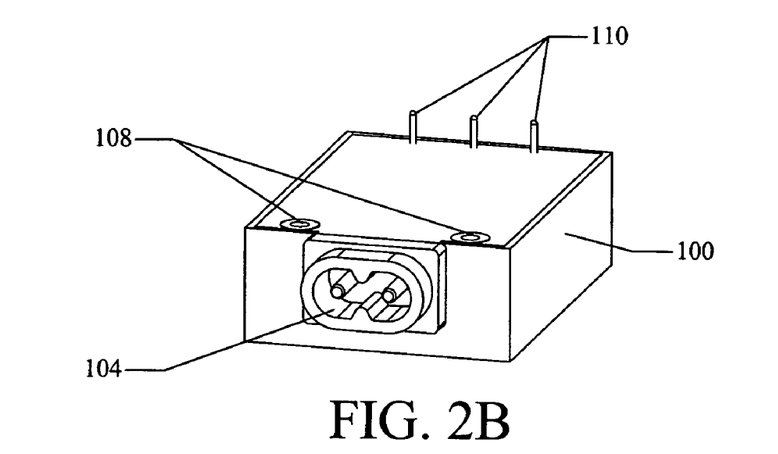
Figure 2C:
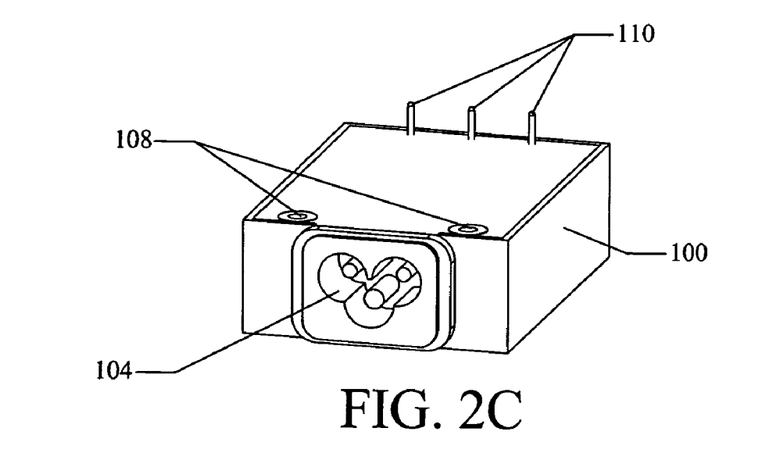

In accordance with one embodiment of the present invention rectified AC is supplied to a power converter which in turn produces DC output to power an associated device. For example, as FIG. 1 illustrates, the electronic power converter 100 may be incorporated within an electronic device 90, and may be directly connected to the printed circuit board 92 of the device. Mounting of the converter 100, as illustrated, may be using screws 94 or similar fasteners, possibly providing a system ground path therethrough. Alternative mounting and grounding possibilities are illustrated in FIGS. 2A-2C. The converters depicted in FIGS. 2B and 2C include an AC input in the form of a standard IEC female-type connector 104, and in an alternative embodiment as illustrated in FIG. 2A, AC power may be provided via pins 105. As illustrated in FIG. 1, AC power is supplied to the converter via a line cord 102, having a conventional AC plug on one end thereof (suitable for use with various AC outlets as may be found wordwide). The opposite end of line cord 102 would have a modular plug 96 (male) that fits within connector 104.

Turning briefly to FIGS. 2A-2C, the various configurations of the converter are illustrated. FIG. 2A illustrates a "drop-in" configuration, where the converter may be employed with a printed circuit board or device having AC power available therein. Accordingly, pins 105 may be used for power input (AC) and pins 110 may be used for power output (DC).

FIG. 2B illustrates a 2-pin device where a 2-pin modular connector 104 is incorporated within the design so that AC power is made available directly to the converter and is contained within the converter. Such a design is believed to be advantageous, as set forth above, to avoid the need for handling AC power within the device or printed circuit board design. Similarly, FIG. 2C illustrates a 3-pin device suitable for including a ground connection in association with the AC lines. Representative specifications for devices such as those depicted in FIGS. 2A-2C are presented in Exhibits A-C, respectively, attached hereto.

As illustrated in FIGS. 1 and 2A-2C, the present invention contemplates a converter that comprises electronic componentry, at least a portion of which is encapsulated. In one embodiment, the encapsulated portion includes at least the high-voltage, AC electronic circuitry. As is also depicted, the converter includes an integrated connector 104 for receiving a detachable line cord having at least two wires therein. And, the power converter is suitable for mounting on a printed circuit board 92 within an electronic device 90.

The encapsulate utilized for an embodiment of the present invention may be a number of types of encapsulating materials, including epoxies, urethanes, silicones. For example, a rigid, two-part epoxy mixed in an appropriate ratio. The encapsulated portions of the power converter are preferably assembled and are then cleaned and inserted within a housing. The housing is preferably a plastic or similar polymer, such as a diallyl phthalate material, but may be any suitable housing made of other materials, including metals. Once installed in the housing, the components are covered with the encapsulating material and the assembly is placed under a vacuum in order to draw air out of any pockets or voids within the assembled components. The encapsulating material is then allowed to cure before the converter is tested.

Figure 3:
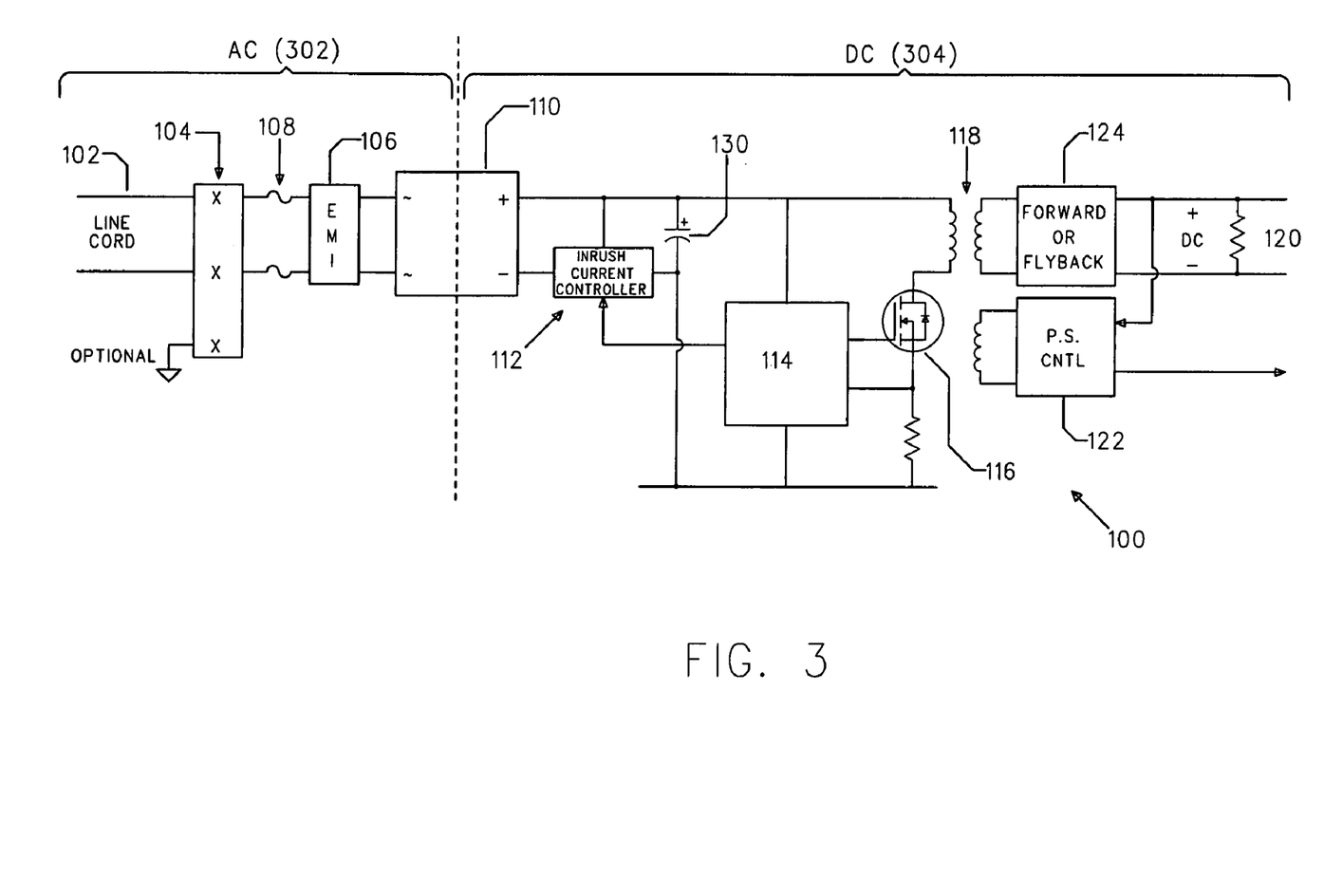
FIG. 3 is a block diagram illustrating the components of a switching power converter with an integrated AC section in accordance with the invention.

Turning next to FIG. 3, there is depicted a general block diagram for the present invention. Within power converter 100, there is an AC section 302 and a DC section 304. As described briefly above, the AC section of the converter 100 receives AC input voltage directly through socket 104, which is connected to the AC outlet by means of a detachable line cord 102. The AC voltage is then passed through the current overload fuses 108 to the electromagnetic interference filter 106 which suppresses any noise in the power line. Output of the EMI filter 106 is provided to the full wave bridge rectifier 110. At this point the inrush current controller 112, holds back on the input voltage from line 102 until such a time when the incoming AC voltage is near zero. At that time, circuit 112, connects capacitor(s) 130 to the bridge rectifier, allowing capacitor(s) 130 to charge with the rising sinusoidal voltage waveform.

Once capacitor 130 is charged, the switching controller 114 turns on and begins applying an AC waveform to the primary windings of transformer 118. The controller also provides a signal to keep the inrush controller 112 on. The transformer 118 is constructed in such a manner so that the ratio of turns from the primary to the secondary will provide the required DC voltage level at the output voltage. Although a forward switch mode topology may be preferable, it is possible to use flyback, resonant, half-bridge or other standard topologies. The power supply control circuit 122 allows the supplied device 120 to monitor the voltage and control the on/off state of the power supply 100.

Figure 4A:
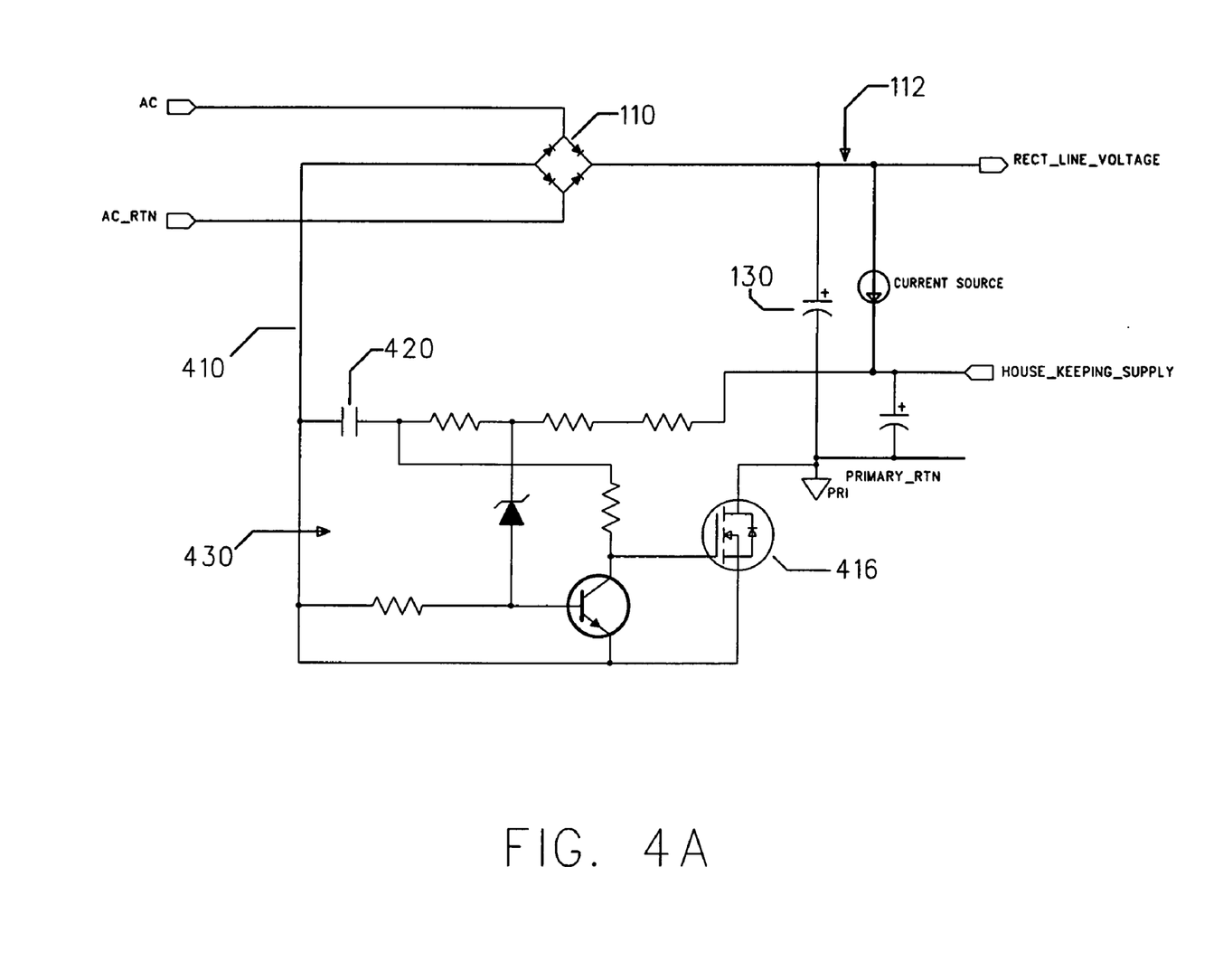
FIGS. 4A and 4B are circuit schematic diagrams illustrating inrush voltage management components.
Figure 4B:
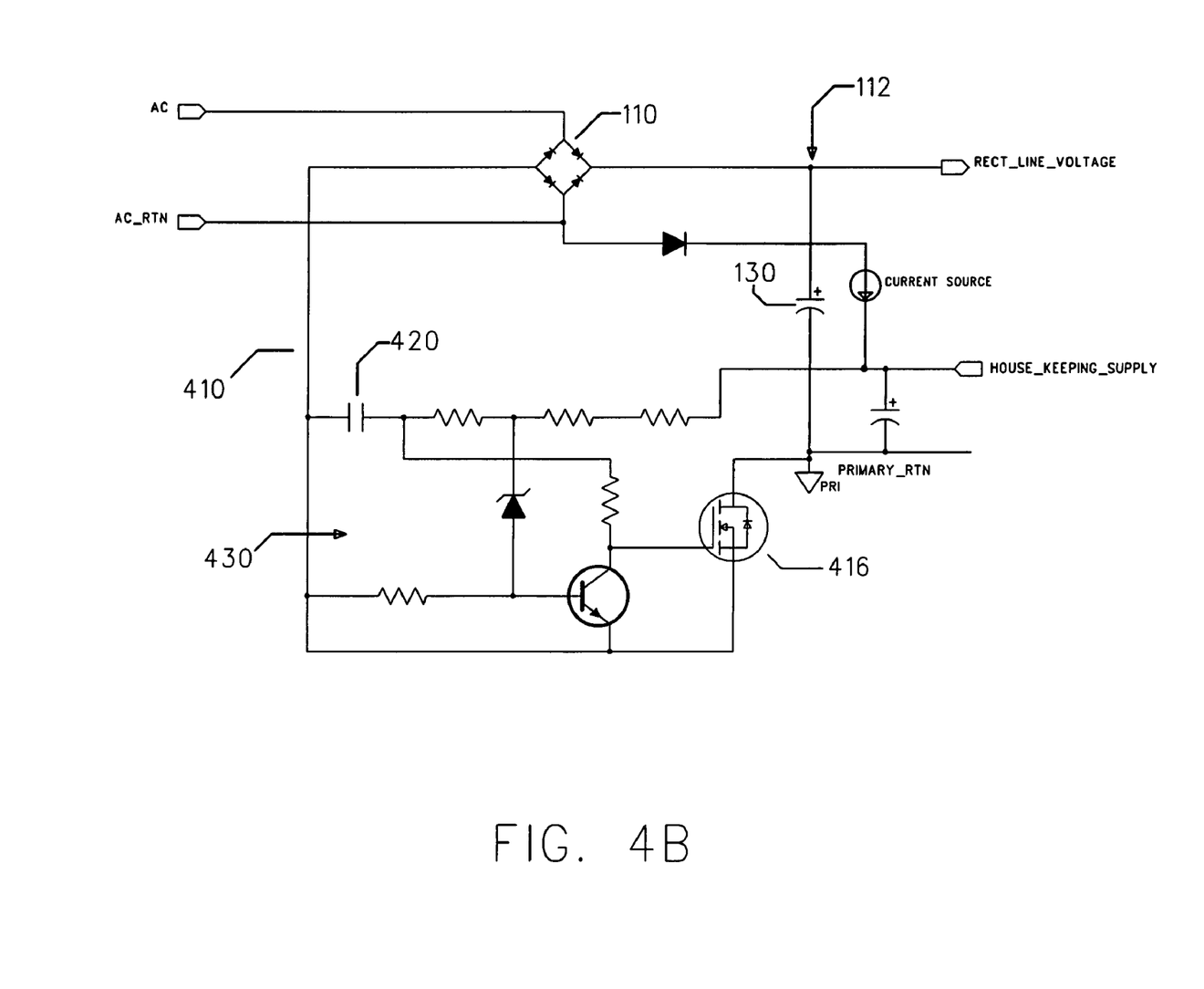

Turning next to FIGS. 4A and 4B, there are illustrated two alternative circuits for inrush control 112. In one embodiment, the inrush current limiting circuit includes a rectifier with a DC return path 410. The MOSFET switch 416 is, in turn, connected to the DC return path of the bridge rectifier. The inrush circuit 112 also includes a capacitor 420 that is charged via a current limited source at a rate which is much slower than the AC line frequency. The voltage on this capacitor provides a source of charge for gating the MOSFET switch 416. A voltage level detection circuit 430 is employed to maintain the MOSFET switch 416 in an off state until the line voltage reaches a near zero threshold at which time a resistive charging path turns the MOSFET switch to an on state. Finally, a resistive connection to the HOUSE_KEEPING_SUPPLY of the switching controller 114 maintains the MOSFET switch 416 in the on state. With respect to FIG. 4B, it will be appreciated that an alternative connection for the current source may be employed. The topology described herein is believed to be applicable to devices for which power may be supplied using standard line cord current. It will be appreciated, however, that additional power ranges, and or multiphase inputs may be employed with modified versions of the circuitry described herein.

Figure 5:
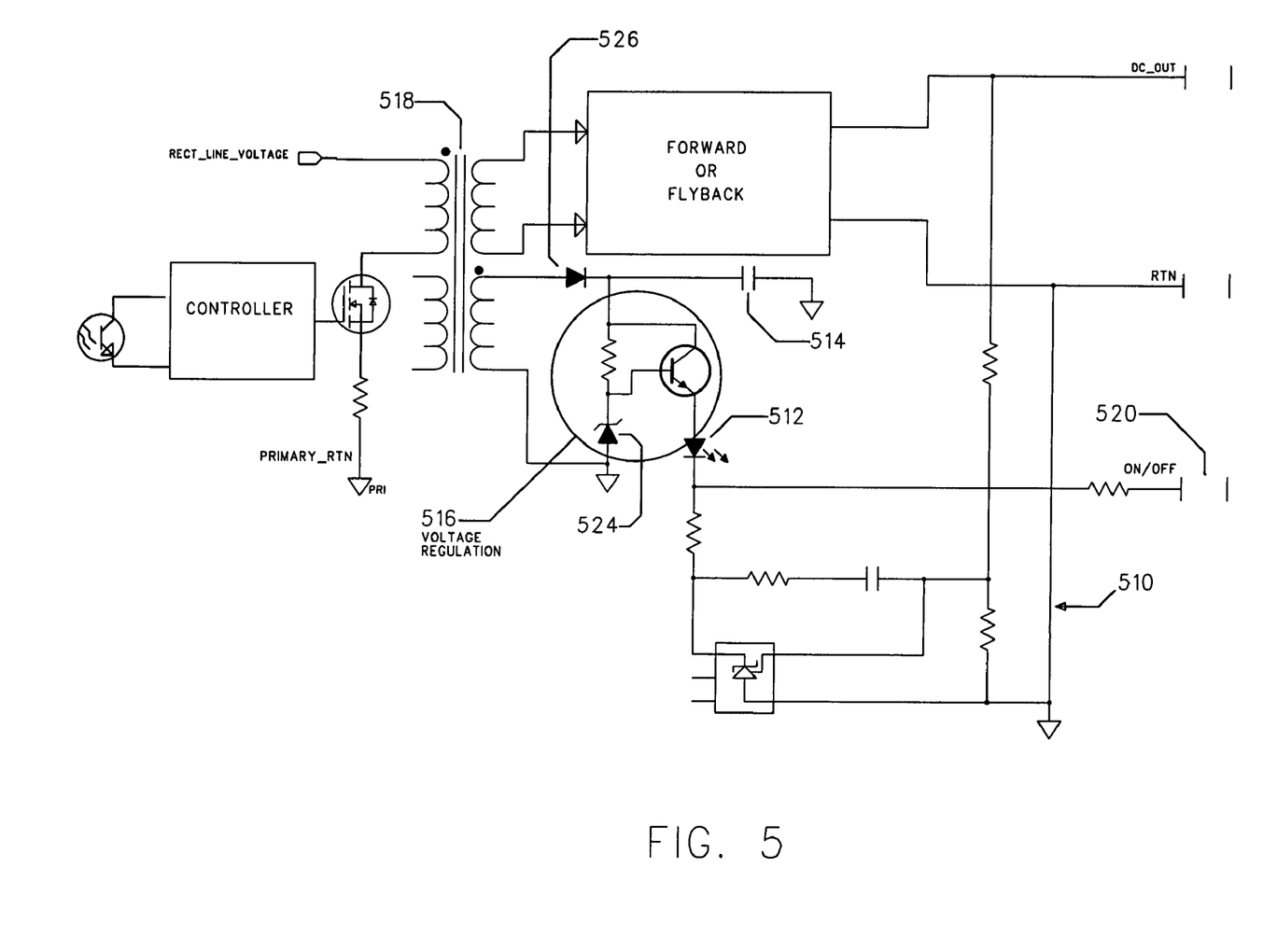
FIGS. 5 and 6 are exemplary schematic illustrations of ON/OFF and low line voltage circuits employed as an aspect of the present invention.

Having described, in general, the components and operation of the AC or high-voltage portion (302) of the power converter, attention is now turned to certain aspects of the DC circuitry (304). In particular, the power converter further includes a secondary side, isolated low voltage ON/OFF function 510. In one embodiment, the function is implemented by circuitry as depicted in FIG. 5. An auxiliary winding of transformer 118 is used to provide power for an ON/OFF circuit. Diode 526 and capacitor 514 form a peak detector and the capacitor 514 is charged in each cycle to a voltage that is directly proportional to the input line voltage. Voltage regulator 516 limits the peak voltage at the ON/OFF pin 520 to typical logic level voltages. By grounding the ON/OFF pin 520, a sufficient current flows through opto-coupler 512, which turns off the switching controller 114.

The circuit of FIG. 5 can provide an isolated low input voltage sense capability for the user by using a higher breakdown voltage for zener diode 524. Such a function will allow a user to sense when the power is going down. The voltage at the ON/OFF pin will now be proportional to the input line voltage up to the point where the zener diode 524 conducts. For example, suppose that the rated line voltages are between 90 VAC and 240 VAC, with operation possible at a brownout level of 85 VAC and a worst case peak of 265 VAC. The voltage on capacitor 118 could range from approximately 60V to 380V with various line and loads. For a transformer turns ratio of 112:12 and for a 0.7V forward diode drop, the voltage on the capacitor 514 will range from approximately 5.7V to 40V. If the zener diode 524 has a threshold of 6.8V, the minimum voltage at the ON/OFF pin is 5.7V minus 0.7V (for transistor base emitter drop) minus 1.3V (opto-coupler LED), equal to 3.7V. Voltages below this level indicate that the primary voltage has dropped below the rated values.

Figure 6:
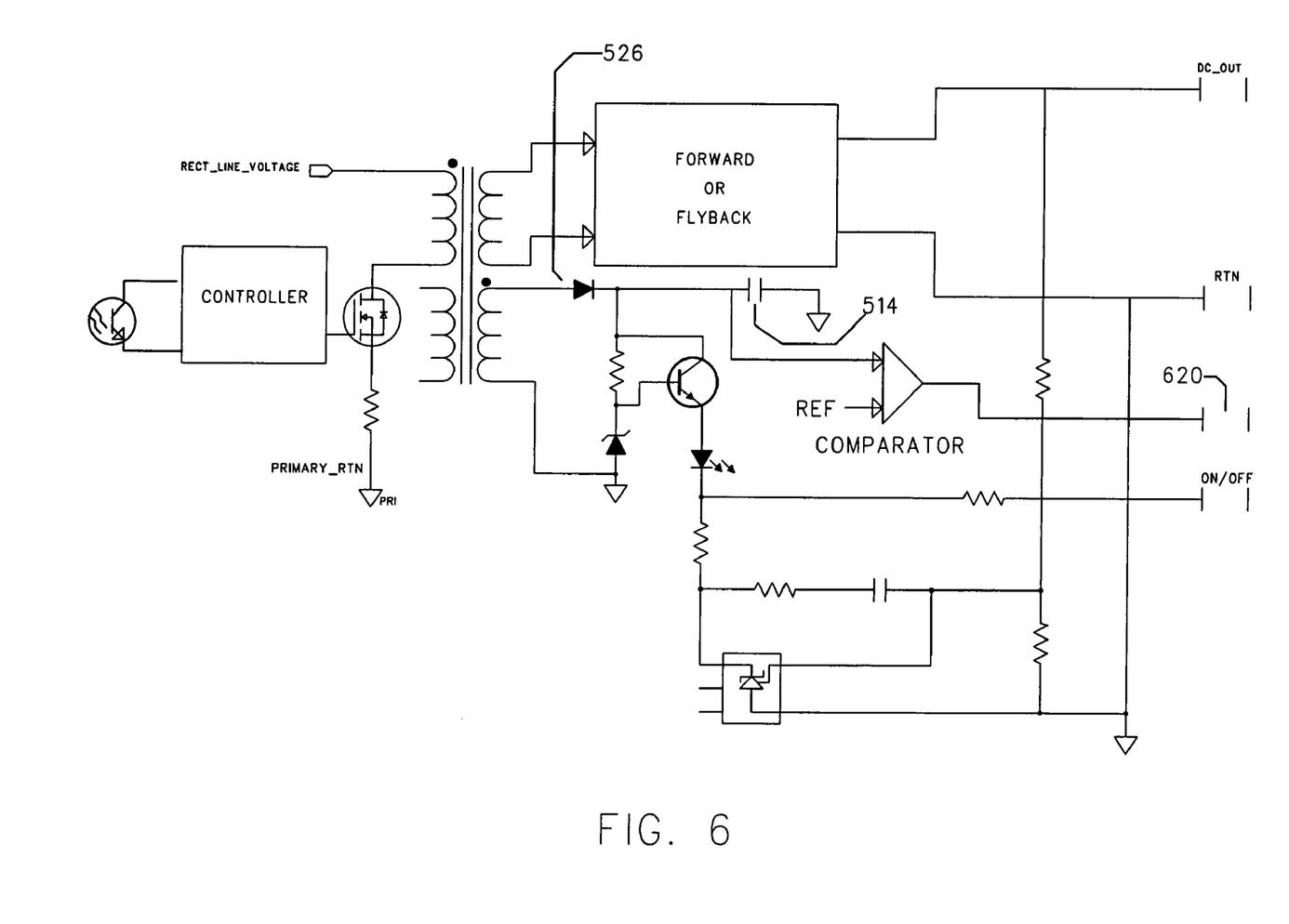

Referring to FIG. 6, a low voltage indicator signal for the encapsulated power converter can also be implemented by sensing the peak voltage on capacitor 514, comparing the sensed voltage to a fixed threshold (REF voltage) and transmitting a logic level compatible or open collector signal to the user on an independent pin 620. As will be further appreciated from the various functions described above in FIGS. 5 and 6 may be combined to provide the isolated low voltage ON/OFF function and a low voltage sense function.

In recapitulation, the present invention is a method for improving the implementation and capabilities of an AC to DC power supply when an on board drop in DC power source is required. The inventive combination of integrated AC components with a detachable power cord, along with reliability improvements that minimize electrical stress from inrush, over and under voltage situations has provided a significant advancement in power supply packaging.

It is, therefore, apparent that there has been provided, in accordance with the present invention, a method and apparatus for supplying DC power to a printed circuit board assembly that addresses a previously unanswered need in the electronics industry for fully self-contained and integrated drop-in AC to DC power supplying solution. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An electronic power converter for supplying direct current power output from alternating current power input, comprising:
   an encapsulated portion including at least high-voltage electronic circuitry where components of the at least high-voltage electronic circuitry are coated with an encapsulating high-dielectric material that is substantially free of voids therein to prevent breakdown; and
   an integrated connector for receiving a detachable alternating current line cord, the alternating current line cord having at least two wires therein;
   wherein said power converter is mountable as a component on a printed circuit board to supply direct current power to the printed circuit board.

2. The power converter of claim 1, further comprising an inrush current limiting circuit, said inrush current limiting circuit, including:
   a. a bridge rectifier with a direct current return path;
   b. a MOSFET switch connected to the direct current return path of the bridge rectifier;
   c. a capacitor which is charged via a current limited source;
   d. a voltage level detection circuit to maintain the MOSFET switch in an off state until a line voltage reaches a near zero threshold;
   e. a resistive charging path to turn the MOSFET switch to an on state once the line voltage reaches the near zero threshold; and
   f. a resistive connection to a housekeeping supply of the power converter which maintains the MOSFET switch in the on state.

3. The power converter of claim 1, further comprising:
   a secondary side, isolated low voltage ON/OFF function, said function being implemented by circuitry including a transformer coupled peak detector to power a light emitter of an opto-coupler which has a photo-detector, the photo-detector being connected to the switching controller in a manner adequate to disable the power supply output in response to the signal received by the photo-detector, said emitter is also connected to a user accessible ON/OFF pin.

4. The power converter of claim 1, further comprising a low voltage sense function consisting of a peak detector connected to the power supply transformer for sensing a primary rectified voltage in a secondary low voltage manner; and a pin, accessible to the user, providing a signal representing the low voltage sense function.

5. The power converter of claim 4, further comprising:
a comparison circuit, connected to the peak detector, for comparing the peak detected voltage to a known reference voltage and producing a signal indicating a range within which the primary rectified voltage falls.

6. The power converter of claim 1, further comprising:
a secondary side, isolated low voltage ON/OFF function; and
a low voltage sense function, said functions being implemented by circuitry including a peak detector for sensing the instantaneous primary rectified voltage connected to a linear regulator/voltage limiting circuit, said linear regulator/voltage limiting circuit being further connected to a light emitter of an opto-coupler, said opto-coupler being further connected to an error amplifier and an ON/OFF pin in such a manner as to provide an isolated secondary low voltage indication of the primary line voltage and to allow the user to turn the device off.

7. An electronic encapsulated power converter, comprising:
a case;
circuitry for supplying direct current power output from alternating current power input;
an encapsulating material coating the circuitry, the encapsulating material having a high dielectric constant and thermal conductivity;
an integrated, 3-pin connector for receiving a detachable alternating current line cord, said connector accessible through said case; and
threaded mounts extending from said case, wherein the threaded mounts are earth grounded and allow the converter to be rigidly mounted as a component to a circuit board to supply power thereto.

8. An encapsulated alternating current to direct current power converter having an inrush current limiting circuit, said inrush current limiting circuit, including:
a. a bridge rectifier with a direct current return path;
b. a MOSFET switch connected to the direct current return path of the bridge rectifier;
c. a capacitor which is charged via a current limited source;
d. a voltage level detection circuit to maintain the MOSFET switch in an off state until a line voltage reaches a near zero threshold;
e. a resistive charging path to turn the MOSFET switch to an on state once the line voltage reaches the near zero threshold; and
f. a resistive connection to a housekeeping supply of the power converter which maintains the MOSFET switch in the on state;
wherein said current limiting circuit is encapsulated with the power converter.

9. The power converter of claim 8, further comprising:
a secondary side, isolated low voltage ON/OFF function, said function being implemented by circuitry including a transformer coupled peak detector to power a light emitter of an opto-coupler which has a photo-detector, the photo-detector being connected to the primary controller in a manner adequate to disable the power supply output in response to the signal received by the photo-detector, said emitter is also connected to a user accessible ON/OFF pin.

10. The power converter of claim 8, further comprising a low voltage sense function consisting of a peak detector connected to the power supply transformer for sensing a primary rectified voltage in a secondary low voltage manner; and
a pin, accessible to the user, for providing a signal representing the low voltage sense function.

11. The power converter of claim 10, further comprising:
a comparison circuit, connected to the peak detector, for comparing the peak detected voltage to a known reference voltage and producing a signal indicating a range within which the primary rectified voltage falls.

12. The power converter of claim 8, further comprising
a secondary side, isolated low voltage ON/OFF function; and
a low voltage sense function, said functions being implemented by circuitry including a peak detector for sensing the instantaneous primary rectified voltage connected to a linear regulator/voltage limiting circuit, said linear regulator/voltage limiting circuit being further connected to a light emitter of an opto-coupler, said opto-coupler being further connected to an error amplifier and an ON/OFF pin in such a manner as to provide an isolated secondary low voltage indication of the primary line voltage and to allow the user to turn the device off.

13. The power converter of claim 10, wherein the low voltage sense function is implemented by circuitry including:
a. a comparison circuit which compares an instantaneous primary voltage to a known reference voltage;
b. a peak detector, electrically connected to said comparison circuit, for sensing the instantaneous primary voltage and providing a signal indicating the instantaneous primary voltage to the comparison circuit; and
c. an independent pin, connected to the comparison circuit to provide an output signal when the instantaneous primary voltage is determined to be below the reference voltage.

14. An electronic device, comprising;
at least one circuit board located within the device;
a cover enclosing the electronic device; and
an electronic power converter including fully encapsulated electronic circuitry, the circuitry coated with an encapsulating material, the encapsulating material having thermal conductivity and a high dielectric constant; and
an integrated connector, accessed through an aperture in said cover, for receiving a detachable alternating current line cord, the alternating current line cord having at least two wires therein, wherein said power converter is mounted as a component on said circuit board to supply power to said circuit board.

15. The electronic device of claim 14, wherein said integrated connector of the power converter provides connection to an alternating current utility line source that is independent of the circuit board to which the power converter is attached.

16. The electronic device of claim 14, further comprising an inrush current limiting circuit, said inrush current limiting circuit, including:
a. a bridge rectifier with a direct current return path;
b. a MOSFET switch connected to the direct current return path of the bridge rectifier;
c. a capacitor which is charged via a current limited source;
d. a voltage level detection circuit to maintain the MOSFET switch in an off state until a line voltage reaches a near zero threshold;

e. a resistive charging path to turn the MOSFET switch to an on state once the line voltage reaches the near zero threshold; and f. a resistive connection to a housekeeping supply of the power converter which maintains the MOSFET switch in the on state.

17. The electronic device of claim 16, further comprising: a secondary side, isolated low voltage ON/OFF function, said function being implemented by circuitry including a transformer coupled peak detector to power a light emitter of an opto-coupler which has a photo-detector, the photo-detector being connected to the primary controller in a manner adequate to disable the power supply output in response to the signal received by the photo-detector, said emitter is connected to a user accessible ON/OFF pin.

18. The electronic device of claim 16, further comprising a low voltage sense function consisting of a peak detector connected to the power supply transformer for sensing a primary rectified voltage and providing a representative signal to a pin that is accessible to the user.

19. The electronic device of claim 18, further comprising: a comparison circuit, connected to the peak detector, for comparing the peak detected voltage to a known reference voltage and producing a signal indicating a range within which the primary rectified voltage falls.

20. The electronic device of claim 16, further comprising: a secondary side, isolated low voltage ON/OFF function; and a low voltage sense function, said functions being implemented by circuitry including a peak detector for sensing the instantaneous primary rectified voltage connected to a linear regulator/voltage limiting circuit, said linear regulator/voltage limiting circuit being further connected to a light emitter of an opto-coupler, said opto-coupler being further connected to an error amplifier and an ON/OFF pin in such a manner as to provide an isolated secondary low voltage indication of the primary line voltage and to allow the user to turn the device off.

* * * * *